STEADY-STATE HEAT OF FUSION THERMOELECTRIC GENERATOR

Filed Jan. 28, 1963

INVENTORS
GEORGE E. RICH
GREGORY S. MC CARTHY
BY Ervin F. Johnston
George F. Rubens
ATTORNEYS 3,276,720
Patented Oct. 4, 1966

3,276,720

STEADY-STATE HEAT OF FUSION THERMOELECTRIC GENERATOR

George E. Rich, Los Altos, and Gregory S. McCarthy, Cupertino, Calif., assignors, by mesne assignments, to the United States of America as represented by the Secretary of the Navy Filed Jan. 28, 1963, Ser. No. 254,529
1 Claim. (Cl. 244—1)

The present invention relates to a steady-state heat of fusion thermoelectric generator and more particularly to a thermoelectric generator which is capable of producing a substantially constant electrical output when it is subjected to thermal energy from either a short-term transient or fluctuating heat source.

There has become a need for a thermoelectric generator in the missile art which will generate a substantially constant electrical output when utilizing heat energy from a short-term transient or fluctuating heat source produced by friction between the skin of a missile and air when the missile re-enters the earth's atmosphere. Previous thermoelectric generators have employed solid heat collector plates of high thermoconductivity which resulted in the generator producing a fluctuating electrical output due to either a short-term thermal pulse or the fluctuating temperature differentials across the thermoelectric elements. The present generator solves this problem by employing a unique heat storage unit on the hot junction side of the thermoelectric elements which stores thermal energy from the heat source and thereafter supplies a substantially constant temperature to the hot junction of the thermoelectric elements so that the generator will produce a substantially constant output. This storage unit is a container which contains a metal which upon being subjected to the heat from the heat source melts at a constant temperature and stores thermal energy due to its required heat of fusion so that upon cooling back to its solid state it remains at a substantially constant temperature and gives off the heat of fusion. Accordingly, because of the constant temperature of the metal in the container while it is giving off the heat of fusion the hot junction of the thermoelectric elements is subjected to a substantially constant temperature to cause the generator to produce a substantially constant electrical output. Further, the invention provides a generator which will produce a substantially constant electrical output upon being subjected to a long-term thermal pulse even though the quantity of metal in the generator is designed for complete melting of the metal within the container when subjected to a short-term thermal pulse. This is accomplished by disposing a circuit breaker between the storage unit and the thermal source. This circuit breaker is a material that will be physically removed by either melting or vaporization upon receiving a predetermined amount of thermal energy from the heat source so as to break the thermal conductivity between the heat source and the storage unit. The container of the storage unit will employ a high reflective surface so that essentially no more thermal energy will enter the storage unit even though the heat source is still very active. The components described above are used in combination with other components such as insulation and a heat sink to produce a steady state electrical output even though the generator is subjected to either a short-term thermal pulse or a long duration fluctuating thermal pulse.

An object of the present invention is to provide a thermoelectric generator which will produce a substantially constant electrical output upon being subjected to a fluctuating thermal pulse and a corollary object of producing the constant output when the thermal pulse is of a high temperature.

Another object is to provide a thermoelectric generator which will produce a substantially constant electric output upon receiving either a short term thermal pulse or a long term fluctuating thermal pulse.

Other objects and many of the attendant advantages of this invention will be readily appreciated as the same becomes better understood by reference to the following detailed description when considered in connection with the accompanying drawing in which like reference numerals designate like parts throughout the figures thereof and wherein.

Figure 2:
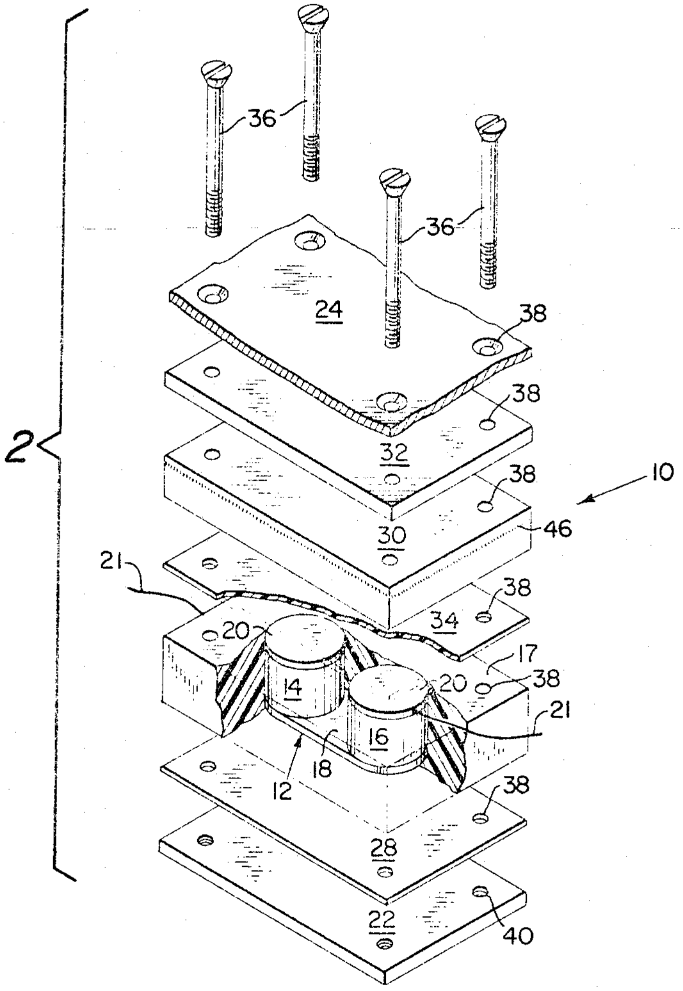
FIG. 2 is an exploded isometric view of the thermoelectric generator with the skin of the missile and insulation partly cut away.

Referring now to the drawings, wherein like reference numerals designate like or corresponding parts throughout the several views, there is shown in FIG. 2 a thermoelectric generator 10 having a thermocouple 12. The thermocouple 12 has two thermoelectric elements 14 and 16 which are potted with insulation 17 and are electrically joined together by a cold junction bus bar 18 and a hot junction bus bar 20, the hot junction bus bar 20 having electrical output leads 21. The thermocouple 12 is disposed between a heat sink 22 and the skin 24 of a missile 26, the heat sink 22 being electrically insulated from the cold junction bar 18 by a thin sheet of insulation 28. Disposed between the hot junction bus bar 20 and the skin 24 of the missile is a heat storage unit 30 and a thermal circuit breaker 32, the heat storage unit 30 being electrically insulated from the hot junction bus bar 20 by a thin sheet of insulation 34. The entire generator 10 is held rigidly together with adjacent components in mating contact with one another by four bolts 36 which pass through holes 38 in the components and screw into threaded openings 40 in the heat sink 22.

Figure 3:
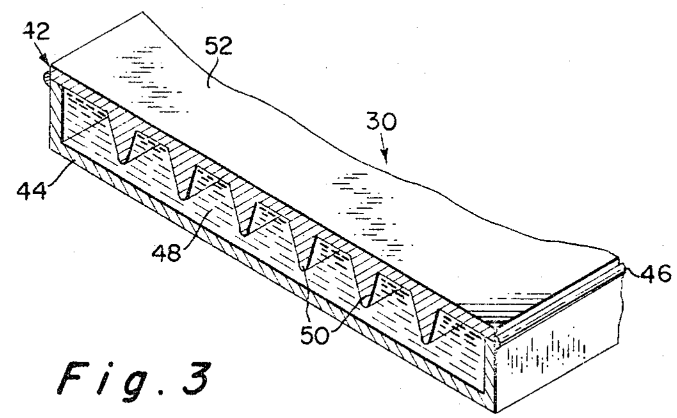
FIG. 3 is a cross-sectional view of the heat storage unit employed in the thermoelectric generator.
Figure 1:
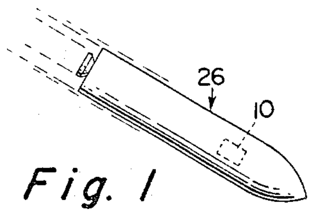
FIG. 1 illustrates a missile employing the invention while the missile is re-entering the earth's atmopshere.

As shown in FIG. 3 the storage unit 30 has a lid 42 which is sealed to a box portion 44 by a seam weld 46 completely around the container. Disposed within the storage unit 30 is a metal 48 which upon proper design of the generator 10 takes on only enough heat to go to a melted state so that the metal 48 will supply a substantially constant temperature to the hot junction bus bar 20 as the metal changes state from a liquid back to a solid. In order to uniformly heat up the metal 48 the lid 42 is provided with fins 50. Further, the top surface 52 of the lid 42 is plated with a highly reflective metal such as bright nickel or highly polished stainless steel for purposes to be described hereinafter.

The generator 10 must of course be designed for the particular parameters involved. This entails employing the proper materials for the various components and the proper quantities thereof. Below is an example of a generator employing all of the components shown in FIG. 2 for functioning either in short-range re-entry or long-range re-entry environments of the missile 26. Short-range re-entry is considered to be for missiles having ranges between 500 to 900 nautical miles between launch and target site and long-range re-entry is considered to be for missiles having ranges between 900 to 2500 nautical miles between launch and target site. The short range re-entry is characterized by a relatively short term and low heat thermal pulse penetrating to the hot junction bus bar 20 and the long-term re-entry is characterized by a relatively long term and high heat thermal pulse penetrating to the hot junction bus bar 20. The following design is capable of producing a substantially constant electrical output whether the generator is subjected to the short-term or the long-term re-entry environment:

| Generator Component | Thickness | Material | Heat of Fusion (B.t.u./lb.) | Melting Point, ° F. |
|---|---|---|---|---|
| Bolts 36 | | Mo+½% Ti | | |
| Skin 24 | .040" | W | | 6,150 |
| Circuit breaker 32 | .032" | Al | 167 | 1,220 |
| Container 40 | Thin walled | Cu | 88.8 | 1,980 |
| Metal 48 | | $LiNO_3$ | 131 | 505 |
| Insulation 34 | .001" | Mica | | |
| Bars 18 and 20 | .020" | Nickel | 10.8 | 1,590 |
| Thermoelement 14 | .250" dia. and .500" long. | PbTe with .3 at Percent Na "P" Type Doping. | 10.8 | 1,590 |
| Element 16 | .250" dia. and .500" long. | PbTe with .03 Mol percent $PbI_2$ "N" Type Doping. | 10.8 | 1,590 |
| Insulation 17 | | Yiton B elastomer | | |
| Insulation 28 | .001" | Mica | | |
| Heat sink 22 | .281" | Al | 167 | 1,220 |

The materials selected above are considered to be the most suitable for the parameters involved. However, it is to be understood that other materials can be substituted if properly designed into the generator. For instance, the circuit breaker 32 can be either a fusion type of material (solid to liquid) or a vaporization type of material (solid to vapor). The former includes Al, Mg and Al-Mg eutectics and the latter includes As, K-Tl systems and As-S systems. The material 48 can be any material that will store heat and release it at a constant temperature. Other materials, other than $LiNO_3$, that can be used are Li-K-Na Nitrate Ternary, Li-K-Na Chloride Ternary, LiH or LiOH, $LiNO_3$ changes state at 505° F. which is considered most desirable for the parameters involved. Another type of material that can be employed for the thermoelements 14 and 16 is $Bi_2Te_3$ doped properly to make a "P" type and a "N" type element respectively. Another material that could be employed for the heat sink 22 is Be.

In the operation of the device the generator 10 can be subjected to either short-range or long-range missile flight conditions. The former subjects the generator 10 to a relatively short-term thermal pulse and the latter subjects the generator 10 to a relatively long-term fluctuating thermal pulse. Assuming that the missile is undergoing the short-range flight condition the heat developed between the skin 24 of the missile and the air, as the missile re-enters the earth's atmosphere, will penetrate to the storage unit 30 and melt the melt 48 without raising the temperature of the metal 48 beyond its melting point. Under this condition the circuit breaker 32 remains intact. Upon the metal 48 changing state from a liquid to a solid heat is dissipated to the hot junction 20 of the thermocouple 12 at a constant temperature since there is no change in the temperature of the metal 48 while it is merely changing state. Alternatively, if the generator 10 is subjected to a long-range flight condition the heat developed at the skin 24 is of long duration and fluctuating and upon the metal 48 being heated to its melting point the circuit breaker 32 melts, is physically removed due to the deceleration forces on the missile 26 as it re-enters the earth's atmosphere, and provides an open space between the skin and the storage material container. Upon the circuit breaker 32 being removed the thermal conductivity between the skin 24 and the storage unit 30 is broken and the highly reflective surface of the lid 42 reflects the heat radiated from the skin 24. Accordingly, once again the storage unit 30 operates as described for the short-range condition and delivers a constant heat to the hot junction 20 while the metal 48 is changing state from a liquid to a solid. Throughout each condition the heat sink 22 maintains the cold junction 18 at a substantially constant temperature so that the electrical output of the generator through the leads 21 is at a substantially constant level.

It is now readily apparent that the present invention provides a thermoelectric generator which will supply a substantially constant electrical output even though it is subjected to short-term or long-term fluctuating thermal pulses. This output can then be utilized for supplying power to various components aboard the missile upon re-entry.

Obviously many modifications and variations of the present invention are possible in the light of the above teachings. It is therefore to be understood, that within the scope of the appended claim, the invention may be practiced otherwise than as specifically described.

We claim:

A heat of fusion thermoelectric generator for utilizing heat energy from the skin of a missile upon re-entry of the missile and producing a substantially constant electrical output comprising:

(a) at least one thermocouple having hot and cold junctions, (b) container means having a top and a bottom surface and enclosing a heat storage material, said bottom surface mounted in heat conduction contact with said thermocouple hot junction, said top surface being thermally reflective and adjacent the inner surface of said skin, (c) said storage material having a constant melting temperature, (d) a thermal circuit breaker supported between the inner surface of said skin and the thermally reflective top surface of said container means comprising a normally solid material having a melting point between that of said storage material and that of said skin, so as, upon melting, to be physically removed to substantially eliminate thermal conduction between said skin and said storage material and to expose said reflective surface, and (e) a heat sink mounted on said thermocouple cold junction.

References Cited by the Examiner

UNITED STATES PATENTS

| | | | |
|---|---|---|---|
| 2,463,944 | 3/1949 | Borden | 136—4 |
| 2,952,724 | 9/1960 | Fritts | 136—4 |
| 3,017,444 | 1/1962 | Fritts | 136—4 |
| 3,088,988 | 5/1963 | Menke | 136—4 |
| 3,183,121 | 5/1965 | Moeller | 136—4 |

FOREIGN PATENTS 567,886 3/1945 Great Britain.

WINSTON A. DOUGLAS, *Primary Examiner.*

A. BEKELMAN, *Assistant Examiner.*